US011829150B2

(12) United States Patent
Gaidon

(10) Patent No.: US 11,829,150 B2
(45) Date of Patent: Nov. 28, 2023

(54) SYSTEMS AND METHODS FOR USING A JOINT FEATURE SPACE TO IDENTIFY DRIVING BEHAVIORS

(71) Applicant: Toyota Research Institute, Inc., Los Altos, CA (US)

(72) Inventor: Adrien David Gaidon, Mountain View, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 259 days.

(21) Appl. No.: 16/897,584

(22) Filed: Jun. 10, 2020

(65) Prior Publication Data

US 2021/0389773 A1 Dec. 16, 2021

(51) Int. Cl.
*G05D 1/02* (2020.01)
*G06N 20/00* (2019.01)
(Continued)

(52) U.S. Cl.
CPC ....... *G05D 1/0221* (2013.01); *G06F 18/2148* (2023.01); *G06F 18/251* (2023.01); *G06N 20/00* (2019.01)

(58) Field of Classification Search
CPC .... G05D 1/0221; G06N 20/00; G06K 9/6257; G06K 9/6289
See application file for complete search history.

(56) References Cited

U.S. PATENT DOCUMENTS 10,223,586 B1 * 3/2019 Leibovitz ............. G06V 30/416
10,637,826 B1 * 4/2020 Luo ..................... H04L 63/0227
(Continued)

FOREIGN PATENT DOCUMENTS

WO 2018229552 A1 12/2018

OTHER PUBLICATIONS

Codevilla et al., "Exploring the limitations of Behavior Cloning for Autonomous Driving", found at: arXiv:1904.08980v1 [cs.CV] Apr. 18, 2019.
(Continued)

*Primary Examiner* — Yazan A Soofi
*Assistant Examiner* — Naeem Taslim Alam
(74) *Attorney, Agent, or Firm* — Christopher G. Darrow; Darrow Mustafa PC

(57) ABSTRACT

Systems, methods, and other embodiments described herein relate to determining driving behaviors for controlling a vehicle. In one embodiment, a method includes generating, using textual descriptions in combination with driving log snippets, a joint feature space that represents a coordinated mapping between the textual descriptions and the driving log snippets. The method includes training a policy network to generate identified behaviors from the driving behaviors according to a correspondence between an observed context that is mapped onto the joint feature space and the driving behaviors defined in the joint feature space resulting from at least the textual descriptions. The method includes providing a behavior cloning model including at least an encoder, the joint feature space, and the policy network to generate control behaviors from the driving behaviors defined in the joint feature space according to acquired observations of a surrounding environment of the vehicle.

20 Claims, 7 Drawing Sheets

(51) Int. Cl.
*G06F 18/25* (2023.01)
*G06F 18/214* (2023.01)

(56) References Cited

U.S. PATENT DOCUMENTS

| | | | |
|---|---|---|---|
| 11,352,021 B1* | 6/2022 | Alexander | B60W 60/00274 |
| 2007/0131851 A1* | 6/2007 | Holtz | G06V 10/145 |
| | | | 250/225 |
| 2012/0267853 A1* | 10/2012 | Silver | A63F 3/00006 |
| | | | 273/243 |
| 2018/0129204 A1 | 5/2018 | Ricci et al. | |
| 2018/0227853 A1* | 8/2018 | Kench | G01S 19/34 |
| 2018/0300564 A1* | 10/2018 | Kwant | G06V 20/582 |
| 2019/0065871 A1* | 2/2019 | Pogorelik | G06V 20/582 |
| 2019/0164051 A1 | 5/2019 | Saleem | |
| 2019/0258251 A1* | 8/2019 | Ditty | G06N 3/063 |
| 2019/0299978 A1* | 10/2019 | Balakrishnan | G05D 1/0221 |
| 2019/0318267 A1 | 10/2019 | Zhang et al. | |
| 2019/0377354 A1 | 12/2019 | Shalev-Shwartz et al. | |
| 2019/0392231 A1* | 12/2019 | Dean | G06F 40/30 |
| 2020/0042806 A1* | 2/2020 | Zhang | G06V 20/582 |
| 2020/0192398 A1* | 6/2020 | Xu | G06V 20/582 |
| 2020/0193194 A1* | 6/2020 | Zhang | G06F 18/217 |
| 2020/0363217 A1* | 11/2020 | Zhang | G06V 10/95 |
| 2021/0224601 A1* | 7/2021 | Chen | G06V 20/46 |
| 2021/0239485 A1* | 8/2021 | Peng | G06V 20/20 |
| 2021/0256616 A1* | 8/2021 | Hayward | G06V 30/194 |
| 2021/0295114 A1* | 9/2021 | Ye | G06F 16/5846 |
| 2021/0303872 A1* | 9/2021 | Makke | B60W 60/00259 |

OTHER PUBLICATIONS

Chen et al.,"Learning by Cheating", found at: arXiv:1912.12294v1 [cs.RO] Dec. 27, 2019.
Kelly et al., "HG-Dagger: Interactive Imitation Learning with Human Experts", found at: arXiv:1810.02890v2 [cs.RO] Mar. 11, 2019.
Kuefler et al., "Imitating Driver Behavior With Generative Adversarial Networks", found at: arXiv:1701.06699v1 [cs.AI] Jan. 24, 2017.
Sallab et al., "Meta Learning Framework for Automated Driving", found at: arXiv:1706.04038v1 [cs.AI] Jun. 11, 2017.
Bansal et al., "ChauffeurNet: Learning to Drive by Imitating the Best and Synthesizing the Worst", found at: arXiv:1812.03079v1 [cs.RO] Dec. 7, 2018.
Codevilla et al.,"End-to-end Driving via Conditional Imitation Learning", found at: arXiv:1710.02410v2 [cs.RO] Mar. 2, 2018.

* cited by examiner

SYSTEMS AND METHODS FOR USING A JOINT FEATURE SPACE TO IDENTIFY DRIVING BEHAVIORS

TECHNICAL FIELD

The subject matter described herein relates, in general, to systems and methods for driver behavior cloning through the use of a joint feature space, and, more particularly, to generating a joint feature space through the combined analysis of textual descriptions about driving rules and driving log snippets that provide samples of driving behaviors to then facilitate the identification of driving behaviors according to the joint feature space for a current context.

BACKGROUND

Machine perception and understanding of a surrounding environment through the use of electronic information can represent a difficult task. For example, machines (e.g., robots, autonomous vehicles, etc.) generally use electronic sensors such as cameras, LiDAR, and other sensors to acquire the electronic information about the surrounding environment. The information can take different forms, such as still images, video, point clouds, radar data, and so on. However, understanding the contents of the information, behaviors of associated objects represented therein, and how to respond to the objects and particular situations can be a complex task.

As one example, to autonomously or at least semi-autonomously navigating through the surrounding environment, a machine (e.g., robot, vehicle, etc.) estimates the state of the surrounding environment including various objects (e.g., static, dynamic, etc.) and contexts of those objects, such as positions, trajectories, relationships, rules governing interactions, and so on. The surrounding environment represents a complex system of static and dynamic objects, and thus generating accurate estimations of the various situations (e.g., traffic situations) from which to determine appropriate lawful behaviors for proceeding through the environment can be a difficult task.

In the context of supervised machine learning approaches, training a model to identify relevant behaviors for different contexts may require many manually labeled examples in order to adequately learn appropriate behaviors. Such an approach is generally dubious because of the difficulty associated with acquiring the manually labeled training data set. Thus, a supervised approach may lack adequate training examples because of the difficulty of acquiring such data. By contrast, unsupervised or self-supervised learning operates without the need for manually labeled data by instead relying on the structure of the data itself or inductive biases as priors from which the model may learn. However, unsupervised/self-supervised approaches generally underperform in relation to supervised approaches. Thus, accurately training a machine learning model to identify proper behaviors for controlling a device in different contexts remains an elusive goal.

SUMMARY

In one embodiment, example systems and methods relate to an improved approach to behavior cloning through the use of a joint feature space. In one arrangement, a system is disclosed that employs a unique approach to correlating a control syntax or set of rules with observed behaviors in the form of snippets of sensor data from a control log. The system correlates these disparate sets of information into a joint feature space. The joint feature space then functions to limit the search for behaviors applicable to a present context within a constrained space while also regularizing the representation towards appropriate (e.g., lawful) and interpretable behaviors.

For example, to form the joint feature space, the system may implement a pair of encoders that separately encode textual descriptions describing the control syntax and log snippets (e.g., sensor data observing a behavior) to form separate feature vectors. The feature vectors encode aspects of the separate pieces of data and are mapped onto the joint feature space together. The system may enforce correspondence between snippets and textual descriptions describing the same/similar behavior using, for example, a loss function that assesses similarities (e.g., Euclidean distance) therebetween. In this way, the system encodes the control syntax and the observed behaviors together to define the joint feature space without the use of explicitly labeled training data as a mechanism for deriving control behaviors from presently acquired observations of an environment.

Thus, the system may further derive a behavior cloning model that is comprised of the encoder for processing the observations, the joint feature space, and a policy network. The policy network is, for example, a sub-component of the behavior cloning model that produces outputs identifying specific controls and/or behaviors associated with an original sensor input. That is, the encoder, in one arrangement, processes sensor data from, for example, a set of sensors of a vehicle. The sensor data generally embodies an observation of a particular context in which the vehicle is operating. The encoder produces a feature vector that maps onto the joint feature space and corresponds with a defined behavior.

Accordingly, the policy network accepts the mapping from the joint feature space and produces an output that is the behavior and/or controls associated with the behavior from which the system may ultimately plan movements of the vehicle, control the vehicle, or perform other functions in support of navigating through the environment. In this way, the system improves the identification of behaviors without the use of manually labeled data and with improved performance (e.g., improved accuracy) over unsupervised approaches.

In one embodiment, a vehicle behavior system for determining driving behaviors for controlling a vehicle is disclosed. The vehicle behavior system includes one or more processors and a memory communicably coupled to the one or more processors. The memory stores a training module including instructions that when executed by the one or more processors cause the one or more processors to generate, using textual descriptions in combination with driving log snippets, a joint feature space that represents a coordinated mapping between the textual descriptions and the driving log snippets. The training module includes instructions to train a policy network to generate identified behaviors from the driving behaviors according to a correspondence between an observed context that is mapped onto the joint feature space and the driving behaviors defined in the joint feature space resulting from at least the textual descriptions. The memory stores a network module including instructions that when executed by the one or more processors cause the one or more processors to provide a behavior cloning model including at least an encoder, the joint feature space, and the policy network to generate control behaviors from the driving behaviors defined in the joint feature space according to acquired observations of a surrounding environment of the vehicle.

In one embodiment, a non-transitory computer-readable medium for determining driving behaviors for controlling a vehicle and including instructions that, when executed by one or more processors, cause the one or more processors to perform various functions is disclosed. The instructions include instructions to generate, using textual descriptions in combination with driving log snippets, a joint feature space that represents a coordinated mapping between the textual descriptions and the driving log snippets. The instructions include instructions to train a policy network to generate identified behaviors from the driving behaviors according to a correspondence between an observed context that is mapped onto the joint feature space and the driving behaviors defined in the joint feature space resulting from at least the textual descriptions. The instructions include instructions to provide a behavior cloning model including at least an encoder, the joint feature space, and the policy network to generate control behaviors from the driving behaviors defined in the joint feature space according to acquired observations of a surrounding environment of the vehicle.

In one embodiment, a method for determining driving behaviors for controlling a vehicle is disclosed. The method includes generating, using textual descriptions in combination with driving log snippets, a joint feature space that represents a coordinated mapping between the textual descriptions and the driving log snippets. The method includes training a policy network to generate identified behaviors from the driving behaviors according to a correspondence between an observed context that is mapped onto the joint feature space and the driving behaviors defined in the joint feature space resulting from at least the textual descriptions. The method includes providing a behavior cloning model including at least an encoder, the joint feature space, and the policy network to generate control behaviors from the driving behaviors defined in the joint feature space according to acquired observations of a surrounding environment of the vehicle.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
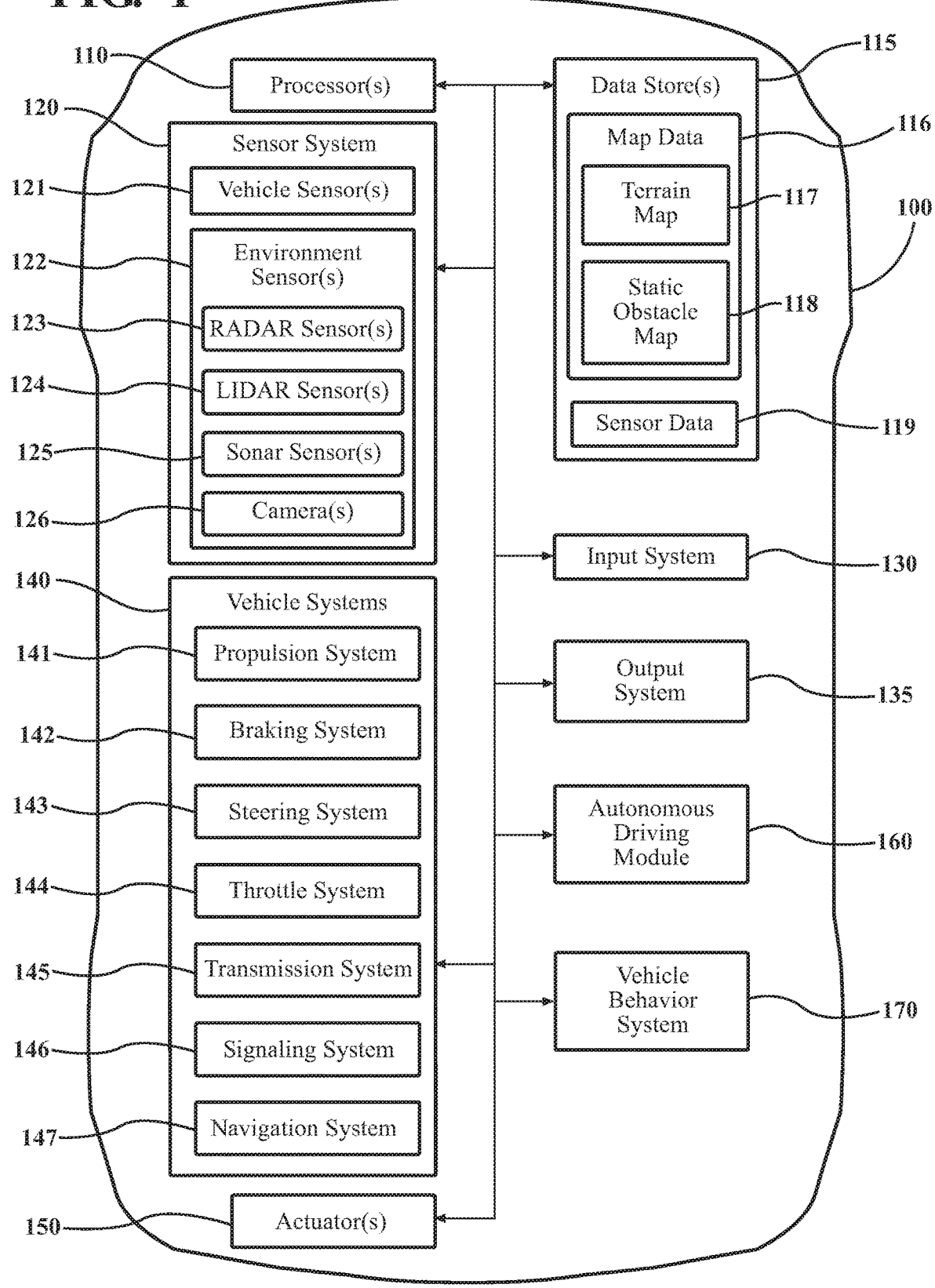
FIG. 1 illustrates one embodiment of a vehicle within which systems and methods disclosed herein may be implemented.

Systems, methods, and other embodiments associated with an improved approach to determining driving behaviors for controlling a vehicle are disclosed herein. As previously noted, perceiving aspects of the surrounding environment and deriving relevant behaviors therefrom can represent different challenges depending on the approach that is undertaken. That is, for supervised approaches, the acquisition of adequate training examples can be problematic, whereas self-supervised/unsupervised approaches that avoid difficulties with labeled training data do not generally perform to the same degree of accuracy as supervised approaches.

Therefore, various embodiments of a vehicle behavior system are disclosed that employ a unique approach to training and forming a behavior cloning model by correlating a control syntax, such as a driver handbook or another set of control rules, with observed behaviors, such as driving log snippets that include sensor data about various driving behaviors and associated contexts. In one aspect, the vehicle behavior system correlates these disparate sets of information into a joint feature space. The joint feature space is, for example, a latent vector space that maps encoded features of data encoded by one or more encoders into feature vectors.

For example, the vehicle behavior system may form the joint feature space by using a pair of distinct encoders to separately encode the different forms of input data. Thus, in one approach, a textual encoder functions to analyze the textual descriptions, which may include regularized textual descriptions of driving rules (e.g., from a driver's handbook), to produce textual feature vectors that encode the noted rules into a temporal sequence of appropriate behaviors. For example, a textual feature vector that encodes a textual rule about turning right on red may take the form of <observe red light, stop, wait, clear?, proceed>, as an abstracted representation of the textual rule. Of course, the example is provided for purposes of discussion, and the actual encoding itself may take a different form.

Similarly, in one approach, the vehicle behavior system includes a log encoder that encodes the driving log snippets, which may include sensor observations of a surrounding environment related to a particular behavior from the perspective of a vehicle, to produce log feature vectors. In a similar fashion as the textual feature vector, the log feature vector encodes the observations from the driving log snippets (e.g., sensor data about a particular behavior) into a regularized temporal description of component aspects of the snippet to provide a comparative form of data that generally corresponds to encodings of the textual descriptions.

In any case, the separate encoders encode the respective feature vectors that are mapped onto the joint feature space together. The vehicle behavior system may enforce correspondence between the log snippets and the textual descriptions that describe similar behaviors using, for example, a loss function that assesses similarities (e.g., Euclidean distance) therebetween. Through this combined mapping, the vehicle behavior system encodes the control syntax and the observed behaviors together to define the joint feature space without the use of explicitly labeled training data as a mechanism for deriving control behaviors from presently acquired observations of an environment. Moreover, forming the joint feature space through the combination of separate types of data elements functions to improve a behavior cloning model that the joint feature space is integrated with by limiting the search for behaviors for a present context within a constrained space while also regularizing the representation towards appropriate (e.g., lawful) and interpretable behaviors.

Thus, the vehicle behavior system forms the behavior cloning model from the log encoder, the joint feature space, and a policy network. Accordingly, the log encoder, in at least one arrangement, functions to process incoming sensor data (i.e., observations of the surrounding environment) into feature vectors that map into the joint feature space. Through a correspondence in the mapping with law and interpretable behaviors as previously defined during the creation of the joint feature space, the mapping provides insights about which behavior may be appropriate for the vehicle to then undertake. As such, the policy network then functions to interpret this mapping into behaviors and/or predicted controls for subsequently controlling the vehicle.

The policy network itself is, for example, a sub-component of the behavior cloning model that produces outputs identifying specific controls and/or behaviors associated with an original sensor input. That is, the log encoder, in one arrangement, processes sensor data from, for example, a set of sensors of a vehicle. The sensor data generally embodies an observation of a particular context in which the vehicle is operating. The log encoder produces a feature vector from the sensor data that maps onto the joint feature space and corresponds with a defined behavior that is appropriate for the context.

Accordingly, the policy network accepts the mapping from the joint feature space and produces an output that is the behavior and/or controls associated with the behavior from which the system may ultimately plan movements of the vehicle, control the vehicle, or perform other functions in support of navigating through the environment. In this way, the vehicle behavior system improves the identification of behaviors without the use of manually labeled data and with improved performance (e.g., improved accuracy) over unsupervised approaches.

Referring to FIG. 1, an example of a vehicle 100 is illustrated. As used herein, a "vehicle" is any form of powered transport. In one or more implementations, the vehicle 100 is an automobile. While arrangements will be described herein with respect to automobiles, it will be understood that embodiments are not limited to automobiles. In yet further embodiments, the vehicle 100 may instead be a statically mounted device, an embedded device, or another device that uses machine perceptions of an environment to derive predictions about behaviors of an instant entity or another entity, or that separately trains a behavior cloning model for deployment in such a device.

In any case, the vehicle 100, as described herein, also includes various elements. It will be understood that, in various embodiments, it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are illustrated as being located within the vehicle 100, it will be understood that one or more of these elements can be located external to the vehicle 100. Further, the elements shown may be physically separated by large distances and provided as remote services (e.g., cloud-computing services, software-as-a-service (SaaS), distributed computing service, etc.).

Some of the possible elements of the vehicle 100 are shown in FIG. 1 and will be described along with subsequent figures. However, a description of many of the elements in FIG. 1 will be provided after the discussion of FIGS. 2-7 for purposes of the brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

In either case, the vehicle 100 includes a vehicle behavior system 170 that functions to train and implement a behavior cloning model to process acquired perceptions in the form of sensor data and generate predicted behaviors/controls therefrom. Moreover, while depicted as a standalone component, in one or more embodiments, the vehicle behavior system 170 is integrated with the autonomous driving module 160, or another component of the vehicle 100. The noted functions and methods will become more apparent with a further discussion of the figures.

Figure 2:
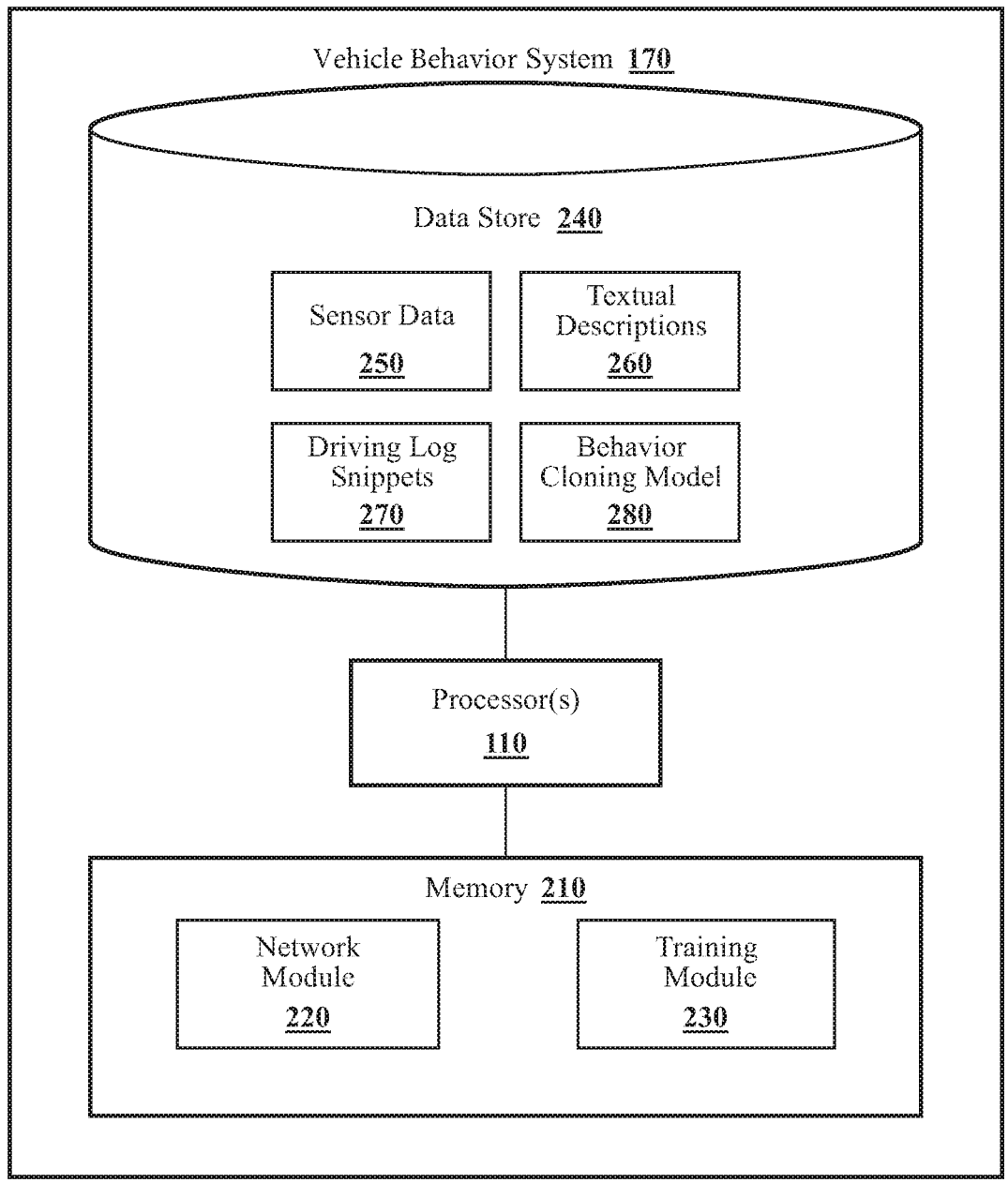
FIG. 2 illustrates one embodiment of a vehicle behavior system that is associated with using a joint feature space to identify behavior for controlling a vehicle.

With reference to FIG. 2, one embodiment of the vehicle behavior system 170 is further illustrated. The vehicle behavior system 170 is shown as including a processor 110. Accordingly, the processor 110 may be a part of the vehicle behavior system 170 or the vehicle behavior system 170 may access the processor 110 through a data bus or another communication path. In one or more embodiments, the processor 110 is an application-specific integrated circuit (ASIC) that is configured to implement functions associated with a network module 220 and a training module 230. In general, the processor 110 is an electronic processor such as a microprocessor that is capable of performing various functions as described herein. While illustrated as a local resource, in various embodiments, the processor 110 may be a cloud-based resource that is remote from the system 170. In one embodiment, the vehicle behavior system 170 includes a memory 210 that stores the network module 220 and the training module 230. The memory 210 is a random-access memory (RAM), read-only memory (ROM), a hard disk drive, a flash memory, or other suitable memory for storing the modules 220 and 230. The modules 220 and 230 are, for example, computer-readable instructions that, when executed by the processor 110, cause the processor 110 to perform the various functions disclosed herein. Thus, the modules 220 and 230 generally embody at least a collection of instructions for controlling the processor 110 according to a specific algorithm or set of algorithms to achieve the corresponding functions as set forth further below in reference to the disclosed method and other discussions.

Furthermore, in one embodiment, the vehicle behavior system 170 includes a data store 240. The data store 240 is, in one embodiment, an electronic data structure such as a database that is stored in the memory 210 or another memory and that is configured with routines that can be executed by the processor 110 for analyzing stored data, providing stored data, organizing stored data, and so on. Thus, in one embodiment, the data store 240 stores data used by the modules 220 and 230 in executing various functions. In one embodiment, the data store 240 includes sensor data 250, textual descriptions 260, driving log snippets 270, and a behavior cloning model 280, along with, for example, other information that is used by the modules 220 and 230.

In general, the sensor data 250 includes information about a surrounding environment of the one or more sensors that acquire the sensor data 250. That is, the sensor data 250 includes perceptions of the one or more sensors (e.g., from sensor system 120). Thus, the sensor data 250 includes observations of the surrounding environment that depend on a particular field-of-view of the sensor and placement of the sensor in the environment. Accordingly, within the context of the vehicle 100, the sensor data 250 may include observations of surrounding vehicles, lane markings, pedestrians, curbs, buildings, traffic signs, and so on. It should be appreciated that the areas perceived by the sensor(s) may encompasses 360 degrees about the vehicle 100 or a narrower perspective. In any case, the sensor data 250 includes information about the surrounding environment of the vehicle 100, which generally characterizes a current context of the vehicle 100. The sensor data 250 itself may include camera images, radar returns, point clouds from LiDAR or other sensors, and so on. Thus, the sensor data 250 may include data from a variety of different sources, which may be fused together into a combined observation or provided in a piecemeal manner. As such, the sensor data 250 functions to provide observations of the surrounding environment in order for further aspects of the system 170 to derive additional determinations.

Furthermore, the driving log snippets 270 are, in at least one approach, generally archived pieces of the sensor data 250 from prior observations. That is, the driving log snippets 270 are, in one approach, a redacted form of the sensor data 250 that include snippets or brief clips of the sensor data 250 corresponding with single behaviors. Thus, by way of example, a single driving log snippet may include sensor data from a time when a vehicle is stopping at a stop sign, driving through a school zone, yielding at a merge, turning at a traffic light, proceeding through a cross-walk, or any other such discrete behavior. It should be appreciated that the discrete behaviors may be further associated with particular contexts, such as type or roadway, weather conditions, presence of traffic/pedestrians, and so on, that may further describe specific aspects related to the behavior. Accordingly, individual driving log snippets may include the same sources of data as in the sensor data 250 but related to a discrete period of time associated with the particular driving behavior.

Moreover, the particular length of any given snippet may vary depending on the specific behavior that is observed, and, as such, the snippets may vary in length from just a few seconds to longer periods of time. In yet a further aspect, the driving log snippets may include telematics data about the operation of the vehicle during the behavior depicted in the snippet. For example, the telematics data may include dynamics data about motion of the vehicle, control configurations of the vehicle (e.g., turn signals active, headlights active, etc.), driver input controls received (e.g., steering wheel turn rate, turn degree, accelerator pedal actuation, brake pedal actuation, etc.), and so on. As such, the driving log snippets include not only discrete observations of behaviors but also corresponding driving control inputs and other information about the vehicle response. Thus, the additional information, such as control inputs, included within the driving log snippets can facilitate unsupervised training of the policy network for behavior cloning.

The data store 240, in one or more approaches, includes the textual descriptions 260. The textual descriptions may take different forms depending on the particular implementation, but in the simplest form include regularized descriptions of appropriate behaviors (e.g., legal or otherwise approved behavior according to a current context). In a further aspect, the textual descriptions may also include inappropriate behaviors (e.g., illegal or behaviors that specifically violate a norm for operating a vehicle) to provide contrasting descriptions of what a vehicle should avoid. In any case, the textual descriptions may be formatted according to a markup language, such as Extensible Markup Language (XML) or another format that clearly delineates separate aspects of a behavior.

Overall, the textual descriptions describe a control syntax for controlling a vehicle according to legal and otherwise appropriate behaviors. Thus, it should be appreciated that depending on local laws and other idiosyncrasies of a particular locality, the textual descriptions and sources of the textual descriptions may vary. However, in general, the vehicle behavior system 170 or another system may derive the textual descriptions from sources, such as a driver's handbook, local statutes, and other relevant sources of driving-related behaviors.

The data store 240 is further illustrated as including the behavior cloning model 280. In various arrangements, the behavior cloning model 280 is a machine learning model that is comprised of subcomponents, including a log encoder, a joint feature space, and a policy network. The separate constituent aspects of the model 280 may take different forms. For example, the log encoder may be embodied as a convolutional neural network, a deep neural network, a recurrent neural network, or a combination of multiple different networks. In general, the log encoder functions to separately analyze the driving log snippets and encode information within the snippets in the form of a log feature vector that represents the original snippet in a vector form. In one approach, the log feature vector may be formatted to temporally include a series of sub-components of the snippet, such as a temporal sequence of events/actions that form the broader behavior, and, in one or more aspects, further including contextual indicator specifying contextual preconditions (e.g., on highway, at traffic light, approaching traffic circle, pedestrians present, etc.) as entry points to particular associated behaviors.

Similarly, the policy network that is part of the behavior cloning model 280 may take different forms depending on the particular implementation. In one or more arrangements, the policy network is a deep neural network, a recurrent neural network (RNN), a convolutional neural network (CNN), or another form of machine learning network. In general, the policy network functions to interpret log feature vectors mapped onto the joint feature space by the log encoder into more intuitive behaviors for a particular context according to guidance from the mapping of the joint feature space in order to provide for driver behavior cloning. Thus, in one or more arrangements, the policy network provides an electronic output in the form of a behavior that specifies how the vehicle 100 should proceed through the surrounding environment according to the perceived sensor data 250. In a further aspect, the vehicle behavior system 170 may train the policy network to produce more specific determinations as output, such as specific control profiles (e.g., braking, accelerating, steering) for controlling the vehicle 100 within the perceived context. In any case, the policy network, the joint feature space, and the log encoder form the behavior cloning model and together function to intake observations of the surrounding environment via the sensor data 250 and provide indications of how to control the vehicle 100 as the output, whether in a broad form of identifying general behaviors or more specifically through indicating exact vehicle control profiles.

As an additional aspect, the vehicle behavior system 170 may implement additional networks as part of a training process. For example, in one or more arrangements, the vehicle behavior system 170 includes a textual encoder in combination with the log encoder when generating the joint feature space. That is, the training module 230 may execute (via the network module 220) the textual encoder over the textual descriptions and the log encoder over the driving log snippets via an unsupervised training process that leverages a loss function (e.g., Euclidean distance, Mahalanobis distance, etc.) to enforce correspondence in the mapping to the joint feature space between the disparate encoders. In any case, the textual encoder may be embodied as a transformer network, a deep neural network, a recurrent neural network, or a combination of multiple different networks. In general, the textual encoder functions to separately analyze the textual descriptions and encode information within the textual descriptions in the form of a textual feature vector that represents the original textual description in a vector form. In one approach, the textual feature vector may be formatted to encode a series of sub-components of the textual rule/behavior, such as a temporal sequence of events/actions that form the description of the rule/behavior. The separate events/action may be divided into separate phases and described using a set of dimensions (e.g., 32) within the feature vector.

Additionally, while the present disclosure describes the textual encoder, the log encoder, the policy network, and the joint feature space as discrete elements that may be stored in the data store 240, it should be appreciated that, in one or more embodiments, the noted components are integrated with the network module 220 to form the behavior cloning model 280 as a mechanism for deep metric learning under hierarchical constraints (e.g., ontological, temporal, physical). That is, the network module 220 functions to execute various processes of the behavior cloning model 280 and use various data structures of the model 280 in support of such execution. Accordingly, in one embodiment, the network module 220 includes instructions that function to control the processor 110 to generate driving behaviors from provided data as disclosed.

Further reference to FIG. 2 and the discussion of the functionality and associated algorithms of the network module 220 and the training module 230 will be undertaken in combination with the discussion of the subsequent figures. Accordingly, with reference to FIG. 3, one configuration of an architecture for generating a joint feature space 330 is shown. In particular, the architecture 300 illustrates, in part, the behavior cloning model 280 as executed by the training module 230 to generate the joint feature space 330. Thus, in one embodiment, the training module 230 includes instructions that cause the processor 110 to generate the joint feature space 330 using the textual descriptions 260 in combination with the driving log snippets 270. As previously described, the joint feature space 330 represents a coordinated mapping between the textual descriptions 260 and the driving log snippets 270.

Thus, the training module 230 employs the log encoder 310 to process the driving log snippets 270 while employing the textual encoder 320 to process the textual descriptions 260. It should be appreciated that while the training module 230 is discussed as using, employing, executing, or otherwise controlling the encoders and/or the behavior cloning model 280, the training module 230 achieves the noted uses via the network module 220, which implements the behavior cloning model 280. In any case, the separate encoders 310 and 320 produce the log feature vector 340 and the textual feature vector 350. As shown, the feature vectors 340 and 350 generally conform to the same format but encode data of differing origins. The form of the feature vectors 340/350 may include a varying number of dimensions according to the implementation. In one approach, the feature vectors 340/350 are comprised of 128 dimensions of encoded values for the respective data sources. The architecture 300 represents three of the dimensions for each of the respective feature vectors 340/350 as "A," "B," and "C." The noted representation is for purposes of discussion, but generally illustrates how the vectors may include a series of temporally encoded representations for different aspects of the textual descriptions 260 and the driving log snippets 270.

By way of example, consider a circumstance in which a vehicle is making a right hand turn when a traffic light is red. The textual descriptions 260 and the driving log snippets 270 can both provide for accounts of such a behavior. In the instance of the textual descriptions 260 a statute may specify particular conditions for performing the behavior legally, such as stop at lane marker, check for oncoming traffic, proceed when traffic is clear. As such, the associated textual feature vector 350 separately encodes each temporal component of the behavior in a serial manner as separate dimensions of the vector 350. In one or more approaches, in addition to the temporal components encoded within the feature vector, the feature vector may also include one or more contextual encodings of an associated behavior category (e.g., merging, turning, etc.) as an initial identifier.

For example, in the instance of the textual feature vector encoding the right turn on red, the A-component may specify a contextual element, such as "red traffic light" while subsequent elements may define further aspects of the appropriate behavior, such as stop, check traffic, and proceed when clear. Further instances of the noted situation may specify variations, such as . . . check traffic, check for "no turn on red sign/condition," and so on. In any case, the textual encoder 320 functions to encode the various features of the specific description into a regularized form that corresponds to a form also produced by the log encoder 310 such that the pair of encoders 310 and 320 map information into the same vector space.

Figure 3:
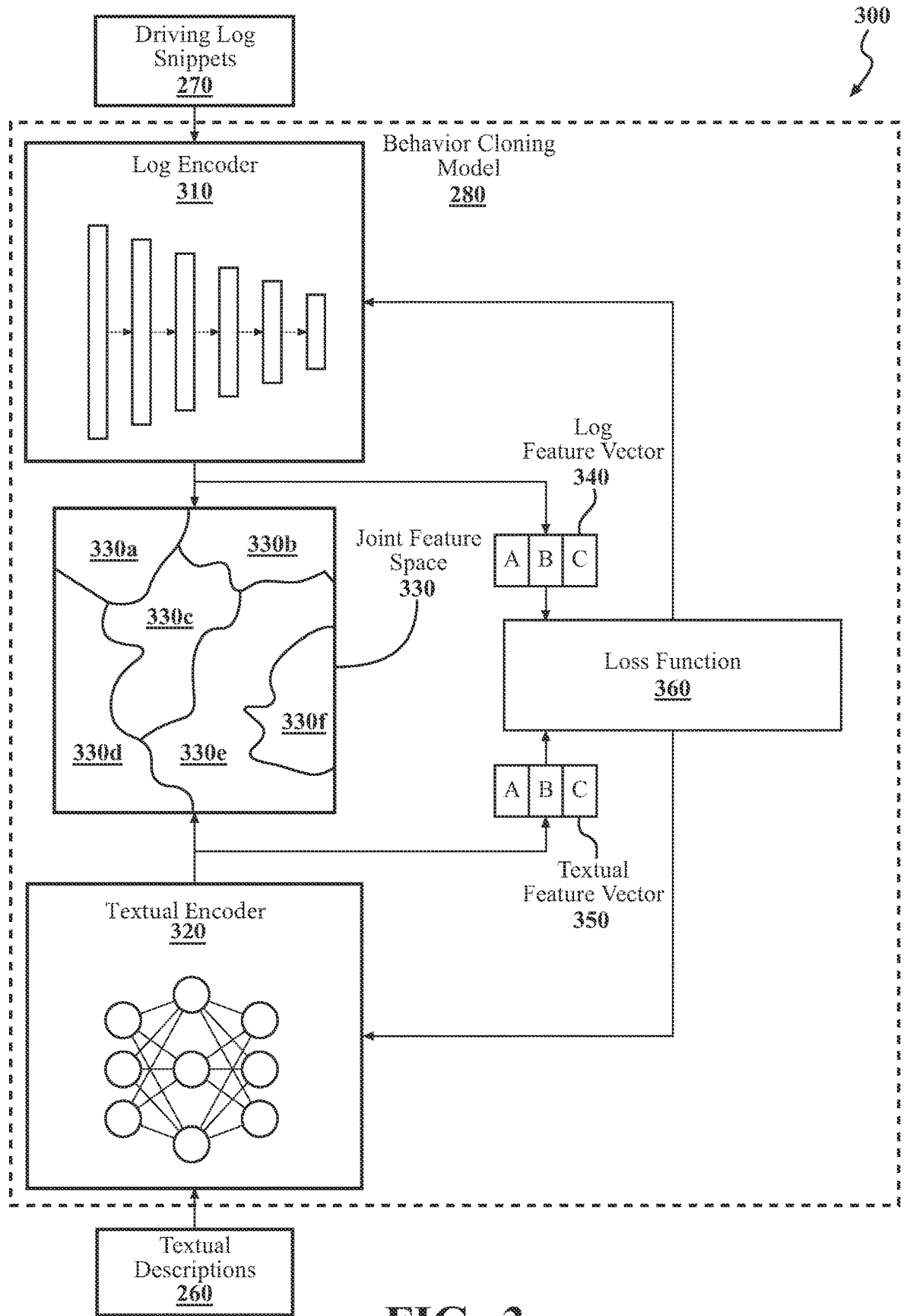
FIG. 3 is a diagram illustrating one embodiment of an architecture for generating the joint feature space.

Therefore, a driving log snippet that provides a perception of a behavior of a vehicle approaching a red traffic light, stopping, and then performing a right turn on red would be similarly encoded by the log encoder 310. Of course, the particular encoding may account for further aspects of the surroundings or circumstances that are to be considered, such as a structure of the roadway, the presence of other vehicles, weather conditions, and so on. The resulting log feature vector 340 and the textual feature vector 350 should then correspond to a similar coordinate location within the joint feature space 330. The joint feature space 330, as represented in FIG. 3, includes a plurality of mapped regions that are labeled as 330a, 330b, 330c, 330d, 330e, and 330f. It should be appreciated that the illustrated form of the joint feature space 330 is provided for purposes of explanation, but generally characterizes how the log encoder 310 and the textual encoder 320 function to generate the joint feature space 330 by projecting the respective feature vectors into the same mathematical space. Thus, the process of generating the joint feature space 330 generally results in a mapping that includes areas of similar behaviors with the textual descriptions mapped onto the space as a mechanism for making the joint feature space interpretable and further defining appropriate (e.g., lawful) behaviors.

As shown, the joint feature space is illustrated as including the unique regions a-f. Of course, in various embodiments, the various regions may be more or less numerous, but the primary point of the illustration is to note that similar behaviors are mapped together while still representing a wide array of variation through the behaviors. Thus, while behavior 330e may characterize a broad set of merging behaviors, behavior 330f may represent a unique subset of merging behaviors associated with, for example, on-ramps of highways. The proximity of behaviors in the space 330 indicates similarities between behaviors.

Accordingly, the training module 230, in one approach, enforces this correspondence through the use of a loss function 360. The loss function 360 is, in one or more approaches, a similarity metric that assesses the similarity between feature vectors. The loss function 360 may implement different similarity functions, such as a Euclidean distance, Mahalanobis distance, or another similarity function that can enforce the correspondence between the textual and log vectors as mapped into the joint feature space 330. In general, the loss function 360 is structured to reflect assumptions within the provided training data and to produce a quality vector space that is semantic and related to rules of the road. While the loss function 360 is discussed as a singular value related to the similarity between vectors overall, in further arrangements, the loss function 360 may provide sub-component losses for each separate phase of a vector. For example, in one embodiment, the encoders 310/320 may generate the vectors with a form that includes multiple dimensions for each phase or temporal aspect of a behavior. The separate phases within the feature vectors may be comprised of 32 dimensions, which the training module 230 then individually assesses and compares to determine a similarity.

Therefore, the training module 230 generates the loss using the loss function 360 and back propagates the loss through the encoders 310/320 to train the encoders and generate the joint feature space. As such, the training module 230 may process the driving log snippets 270 and the textual descriptions 260 from a large training data set in order to derive a comprehensive representation in the feature space 330 that provides for behaviors across the driving spectrum.

Figure 4:
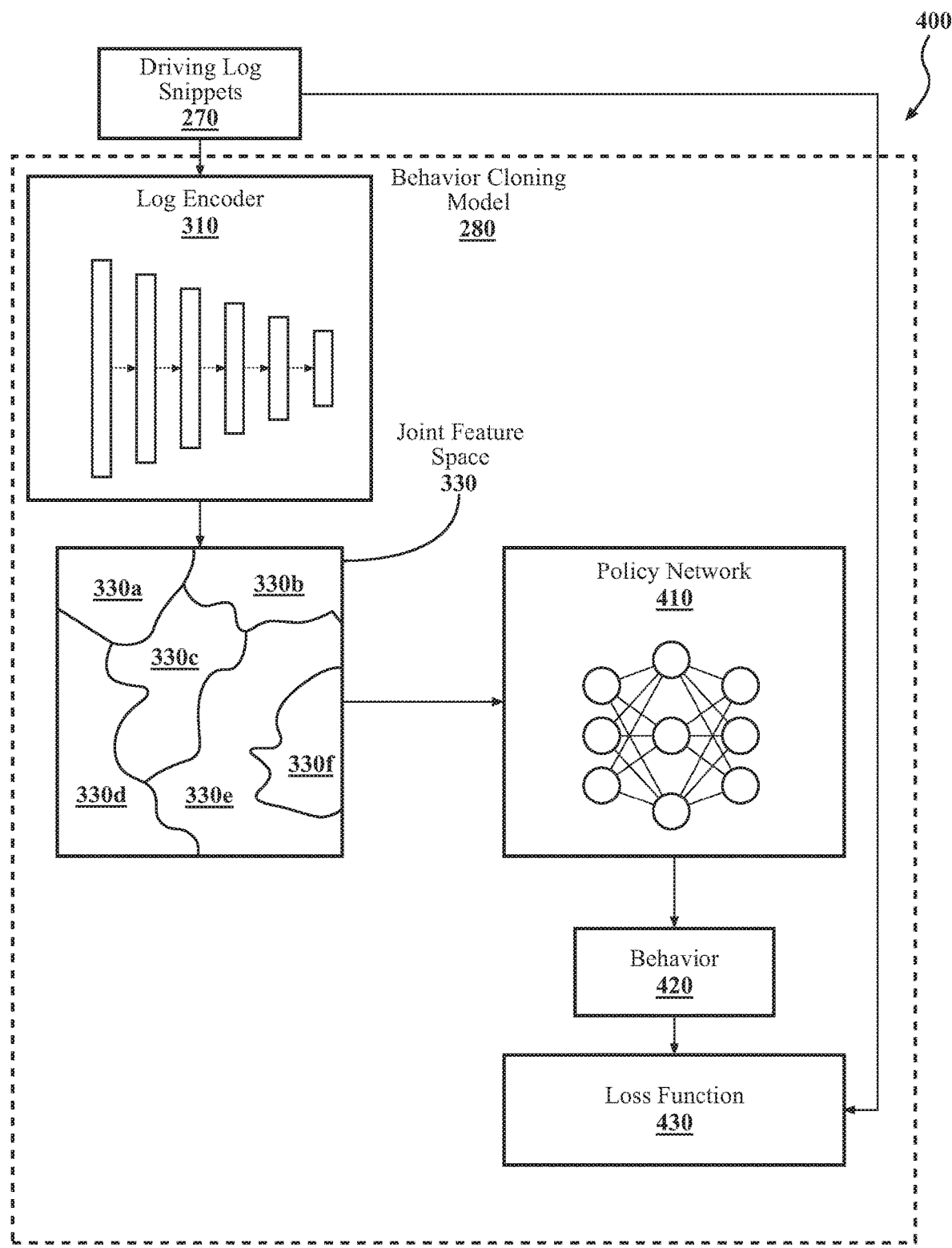
FIG. 4 is a diagram illustrating one embodiment of a configuration for training a policy network.

Continuing to FIG. 4, one configuration of an architecture 400 for training a policy network is shown. In particular, the architecture 400 illustrates the behavior cloning model 280, in part, as executed by the training module 230 to train the policy network 410. Thus, in one embodiment, the training module 230 includes instructions that cause the processor 110 to generate behavior 420 as an output in order to train the policy network 410 against the driving log snippets 270. As previously noted, the driving log snippets 270 also include telematics data, such as driver control inputs (e.g., steering, braking, acceleration, etc.). Therefore, the training module 230 leverages the driving log snippets 270 as training data that includes corresponding ground truth data in the form of the driver control inputs.

Accordingly, to train the policy network 410, the training module 230 causes the network module 220 to execute the behavior cloning model 280, which comprises the log encoder 310, the joint feature space 330, and the policy network 410. In the example architecture 400 for training the policy network 410, the training module 230 is training the policy network 410 to derive vehicle controls as opposed to simply providing determinations of behaviors. In any case, the policy network 410 interprets the mapping of the feature vector (e.g., log feature vector 340) onto the joint feature space 330 and thereby learns a control policy for controlling the network in a lawful manner and according to observations of the surrounding environment as provided via the inputs. That is, the training module 230 trains the policy network 410 by comparing the behavior 420 (i.e., control inputs) with driving control inputs from the snippets 270 according to the loss function 430. The training module 230 can then backpropagate the loss through the policy network 410 for each training iteration to induce the policy network 410 to learn a control policy for controlling the vehicle 100. In this way, the vehicle behavior system 170 generates and uses the joint feature space to form the basis of the behavior cloning model 280 and to provide for regulated behavior cloning according to the feature space that is interpretable and grounded in the textual descriptions such that the learned policy is regulated and associated with legal behaviors.

Figure 5:
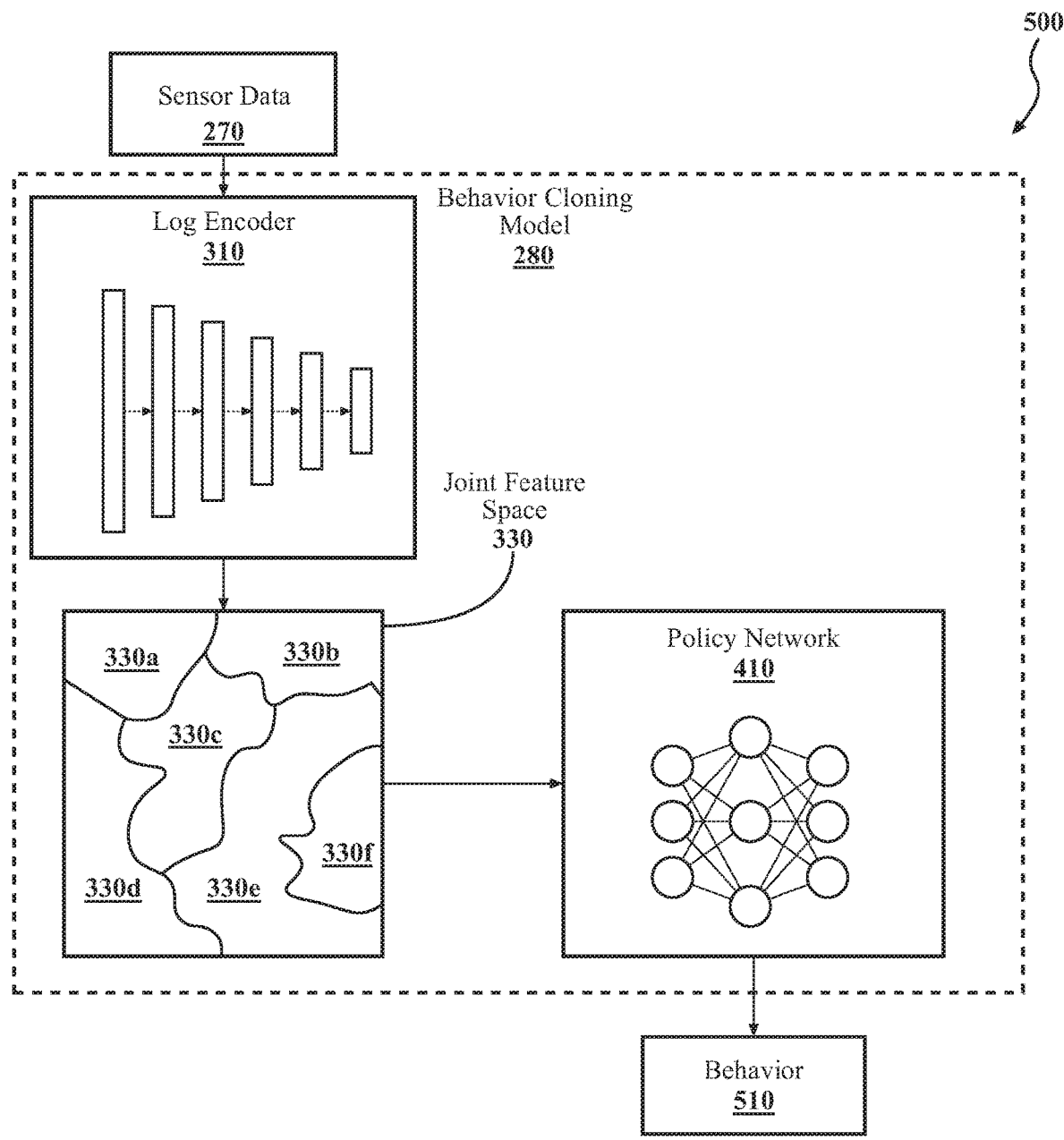
FIG. 5 illustrates one embodiment of a behavior cloning model.

As a further explanation of the behavior cloning model 280, FIG. 5 illustrates the behavior cloning model 280, as employed by the network module 220, to analyze sensor data 250 and generate behaviors (e.g., behavior 510). As shown in FIG. 5, the network configuration 500 of the behavior cloning model 280 includes the log encoder 310, the joint feature space 330, and the policy network 410. The log encoder 310 accepts the sensor data 250 as an electronic input and produces a log feature vector describing the sensor data 250 therefrom. The log feature vector maps onto the joint feature space 330, which the policy network 410 identifies and interprets into the behavior 510 according to the learned control policy. As set forth previously, the behavior 510 may be a broad driving behavior specifying a general way in which to proceed according to the current context embodied by the sensor data 250 or may provide a finer granularity of information as specific as a set of controls and/or trajectories for proceeding through the surrounding environment.

Accordingly, the network module 220 generally controls the behavior cloning model 280 to produce the behavior 510 for the sensor data 250. Further, in at least one arrangement, the network module 220 provides the behavior 510 to additional component systems in the vehicle 100 in order to control the vehicle 100 or at least influence control of the vehicle 100. For example, in one aspect, the network module 220 provides the behavior 510 to an autonomous driving module 160 as a manner of providing autonomous controls for controlling the vehicle 100. In a further aspect, the network module 220 provides the behavior 510 as a suggested trajectory that is used to, for example, seed a trajectory optimization system which ultimately derives an executed trajectory according to the behavior 510 for controlling the vehicle 100. In either case, the vehicle behavior system 170 improves the identification of appropriate regulated behaviors over other approaches through the use of the behavior cloning model 280 using the joint feature space 330.

Figure 6:
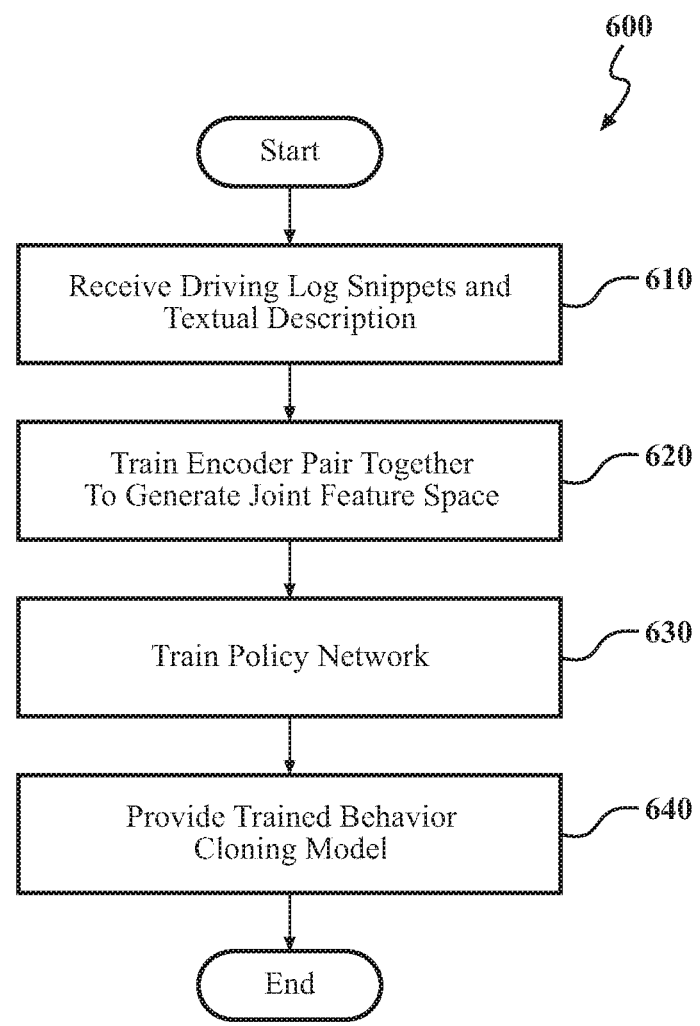
FIG. 6 is a flowchart illustrating one embodiment of a method for generating a joint feature space from textual descriptions and driving log snippets.

Additional aspects of training a behavior cloning model to identify behaviors for a vehicle according to perceptions of a current context will be discussed in relation to FIG. 6. FIG. 6 illustrates a flowchart of a method 600 that is associated with generating a joint feature space from textual descriptions and driving log snippets and further training a policy network to form a behavior cloning model. Method 600 will be discussed from the perspective of the vehicle behavior system 170 of FIGS. 1-2. While method 600 is discussed in combination with the vehicle behavior system 170, it should be appreciated that the method 600 is not limited to being implemented within the vehicle behavior system 170 but is instead one example of a system that may implement the method 600.

At 610, the training module 230 receives training data, including the textual descriptions 260 and the driving logs in the form of snippets 270. In general, the textual descriptions 260 describe rules for controlling the vehicle 100. In one approach, the textual descriptions 260 are structured driving rules from a driver handbook, statute, or another source that are provided in a standardized format, such as an XML format. The driving log snippets 270 generally include segments of sensor data similar to what the vehicle 100 may acquire during operation (e.g., in variety from different sensors). The snippets 270 are segmented according to separate behaviors. Thus, the snippets 270 provide samples of separate behaviors and may further include driver control inputs for controlling the vehicle 100 in the form of recorded telematics data that is recorded in concert with the sensor data forming the snippet. With this data as a training input, the vehicle behavior system 170 has a basis for identifying appropriate behaviors and also has a set of demonstrated behaviors from which the information can be grouped into the joint feature space.

At 620, the training module 230 causes the network module 220 to execute the log encoder and the textual encoder to generate the joint feature space. That is, for example, the training module 230 uses the driving log snippets 270 and the textual descriptions 260 as inputs to the respective encoders as a manner of training the encoders, which further produces the joint feature space as a product of generating a plurality of respective feature vectors. This training process further leverages a loss function to enforce correspondence between the resulting feature vectors and, ultimately, the mapping of the textual descriptions alongside the samples embodied by the snippets in the joint feature space. Thus, the textual descriptions mapped onto the joint feature space provide for interpreting the encoded snippets in a more intuitive manner for a particular context according to guidance from the textual descriptions (i.e., rules, driving handbook, etc.). In other words, the joint feature space illustrates a relationship between demonstrations from the log snippets and rules for appropriate lawful driving as specified by the textual descriptions.

Further, because of this correlation between disparate data elements and the intrinsic interpretable aspects of the textual descriptions, the joint feature space defines a constrained space in which to search the driving behaviors through the combined mapping that delineates between separate appropriate behaviors represented within the joint feature space. By combining the textual descriptions with the driving log snippets, the joint feature space provides an overarching interpretable structure that clearly identifies different behaviors that are appropriate according to the descriptions. Thus, the dually projected joint feature space provides clarity about what is an appropriate behavior.

In any case, the training module 230 trains, in one or more arrangements, a log encoder to map the driving log snippets into the joint feature space as log feature vectors and, in parallel, trains a textual encoder to map the textual descriptions into the joint feature space as textual feature vectors that correspond to associated snippets of the driving log snippets. As previously identified, the training module 230 enforces correspondence between the driving log snippets and the textual descriptions in the joint feature space using a loss function that is based, at least in part, on a similarity metric for comparing the log feature vectors and the textual feature vectors. That is, the training module 230 uses the similarity metric to determine how closely the separate vectors match, which provides for ensuring similar textual descriptions and log snippets map to similar regions in the joint feature space.

At 630, the training module 230 trains the policy network to generate identified behaviors from the driving behaviors within the joint feature space. In one approach, the policy network leverages the correspondence between an observed context that is mapped onto the joint feature space and the driving behaviors defined in the joint feature space resulting from at least the textual descriptions. The policy network can then interpret the mapping and produce a driving behavior that is appropriate for the context. As previously specified, the driving behavior may take different forms that range from specific controls, to suggested trajectories, to broader behaviors (e.g., changes lanes in 200 ft, maintain outside lane for roundabout). In any case, the policy network learns a control policy for producing the behaviors on top of the log encoder and the joint feature space to form the behavior cloning model that is a deep metric learning network. Once this two-stage unsupervised training process is complete, the vehicle behavior system 170 may proceed with implementing the behavior cloning model.

At 640, the network module 220 provides the behavior cloning model 280. In one embodiment, the network module 220 assembles the constituent parts of the behavior cloning model 280, including the log encoder, the joint feature space, and the policy network and provides the behavior cloning model 280 as an available resource in the vehicle 100 for identifying appropriate behaviors in relation to acquired sensor data as will be discussed in further detail subsequently.

Figure 7:
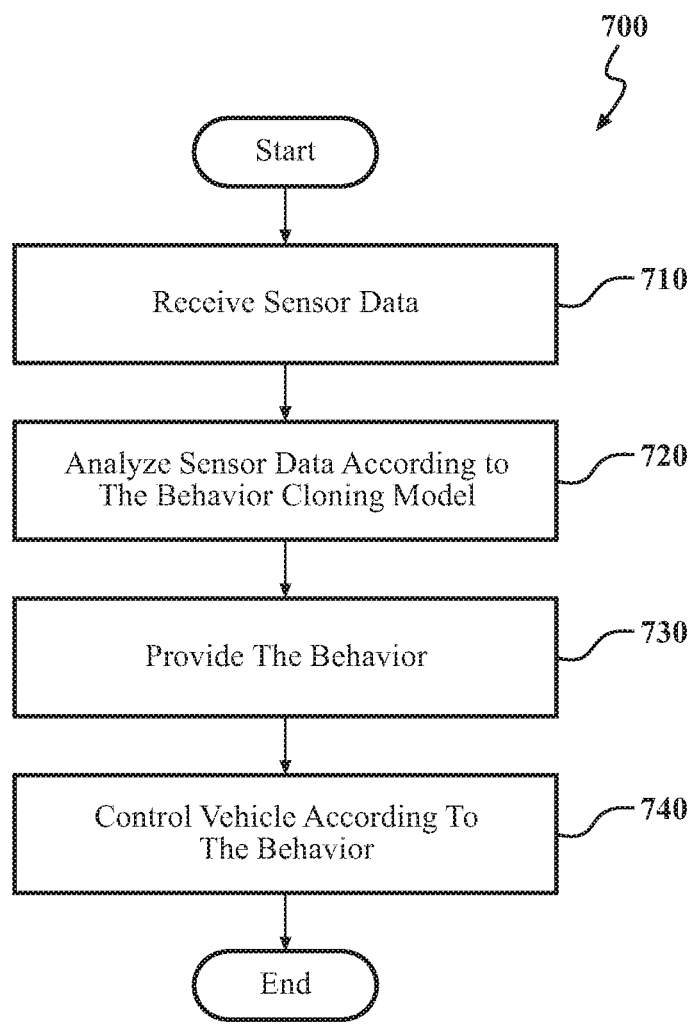
FIG. 7 is a flowchart illustrating one embodiment of a method for identifying behaviors for controlling a vehicle using a joint feature space.

As an additional explanation of how the behavior cloning model 280 may be implemented in the vehicle 100 to assist in deriving behaviors form sensor data consider FIG. 7. FIG. 7 illustrates a flowchart of a method 700 that is associated with identifying driving behaviors using a behavior cloning model that includes a joint feature space. Method 700 will be discussed from the perspective of the vehicle behavior system 170 of FIGS. 1-2. While method 700 is discussed in combination with the vehicle behavior system 170, it should be appreciated that the method 700 is not limited to being implemented within the vehicle behavior system 170 but is instead one example of a system that may implement the method 700.

At 710, the network module 220 receives the sensor data 250. In one embodiment, the sensor data includes information about the surrounding environment of the vehicle 100 as acquired by one or more sensors of the vehicle 100. The sensor data 250 may take different forms depending on the particular suite of sensors available in the vehicle 100, but generally includes at least images from a camera. In a further approach, the sensor data 250 may include 3D point clouds from a LiDAR, stereo camera, or another depth sensing device. In still further aspects, the sensor data 250 may include radar returns, sonar data, IMU data (e.g., reflecting a surface condition of the roadway), and so on. Moreover, the sensor data 250 may be provided as separate observations or fused into a common observation of the surrounding environment. In any case, the sensor data 250 provides an observation of the current context of the vehicle 100 within the surrounding environment including the presence of the vehicle 100 within the roadway, a state of surrounding traffic, nearby traffic signals, and other aspects of the environment that may influence the movement of the vehicle 100.

At 720, the network module 220 uses the behavior cloning model 280 to analyze the sensor data 250 and produce a behavior therefrom. As previously explained, the behavior cloning model 280 processes the sensor data 250 from the vehicle 100 and identifies behaviors for controlling the vehicle 100 therefrom. Thus, the model 280 leverages the joint feature space to search among appropriate behaviors for controlling the vehicle 100, thereby constraining the search space to avoid unlawful or otherwise inappropriate behaviors.

At 730, the network module 220 provides the behavior produced from the behavior cloning model 280 to one or more additional systems in the vehicle 100. In one approach, the network module 220 electronically communicates the behavior to the autonomous driving module 160 or another module that can interpret the behavior to cause the vehicle 100 to maneuver in a desired manner according to the behavior. In one approach, as part of providing the behavior, the network module 220, in isolation or in cooperation with another system of the vehicle 100, may translate the behavior into explicit instructions (e.g., driver control inputs, such as steering, braking, accelerating, etc.) for controlling the vehicle 100 that may be particular to the configuration of the particular vehicle.

At 740, the network module 220 controls the vehicle 100 via the behavior and/or controls provided at 730. In one embodiment, the behavior from 730 is fed into a control system of the vehicle 100 (e.g., autonomous driving module 160) that may then use the behavior as part of a planning process for determining how to navigate the vehicle through the surrounding environment in relation to the present context/configuration of obstacles. In a further aspect, the behavior, when provided as a specific trajectory or specific controls, may be further analyzed by the control system and adapted for dynamic changes in the surrounding environment or other conditions prior to being realized through control of the vehicle 100. In any case, the vehicle behavior system 170 trains the behavior cloning model for, in one aspect, sensorimotor control that utilizes the textual descriptions as an intrinsic source of supervision within an unsupervised training regime to thereby improve the resulting model for identifying control behaviors over other approaches.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles.

The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component, and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such a case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100.

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124 (e.g., 4 beam LiDAR), one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element, or arrangement or groups thereof that enable information/data to be entered into a machine. The input system 130 can receive an input from a vehicle passenger (e.g., a driver or a passenger). The vehicle 100 can include an output system 135. An "output system" includes a device, or component, that enables information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system, or a geolocation system.

The processor(s) 110, the vehicle behavior system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the vehicle behavior system 170, and/or the autonomous driving module(s) 160 may control some or all of these vehicle systems 140 and, thus, may be partially or fully autonomous.

The processor(s) 110, the vehicle behavior system 170, and/or the autonomous driving module(s) 160 can be operatively connected to communicate with the various vehicle systems 140 and/or individual components thereof. For example, returning to FIG. 1, the processor(s) 110, the vehicle behavior system 170, and/or the autonomous driving module(s) 160 can be in communication to send and/or receive information from the various vehicle systems 140 to control the movement, speed, maneuvering, heading, direction, etc. of the vehicle 100. The processor(s) 110, the vehicle behavior system 170, and/or the autonomous driving module(s) 160 may control some or all of these vehicle systems 140.

The processor(s) 110, the vehicle behavior system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the vehicle behavior system 170, and/or the autonomous driving module(s) 160 can control the direction and/or speed of the vehicle 100. The processor(s) 110, the vehicle behavior system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine a position and velocity of the vehicle 100. The autonomous driving module(s) 160 can determine the location of obstacles, obstacles, or other environmental features, including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the vehicle behavior system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-7, but the embodiments are not limited to the illustrated structure or application.

The flowcharts and block diagrams in the Figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, module, as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A vehicle behavior system for determining driving behaviors for controlling a vehicle, comprising:
  one or more processors;
  a memory communicably coupled to the one or more processors and storing:
    a training module including instructions that when executed by the one or more processors cause the one or more processors to generate, using textual descriptions in combination with driving log snippets, a joint feature space that represents a coordinated mapping between the textual descriptions and the driving log snippets,
    wherein the instructions to generate the joint feature space include instructions to train a log encoder to map the driving log snippets into the joint feature space and train a textual encoder to map the textual descriptions into the joint feature space that correspond to associated snippets of the driving log snippets by applying a loss function as a similarity metric to determine a distance between log feature vectors and textual feature vectors in the joint feature space according to one of: a Euclidean distance, and a Mahalanobis distance, and wherein the log encoder and the textual encoder are machine learning models that are deep neural networks (DNNs), wherein the training module includes instructions to train a policy network that is a machine learning model separate from the textual encoder and the log encoder to generate identified behaviors from the driving behaviors according to a correspondence between an observed context that is mapped onto the joint feature space and the driving behaviors defined in the joint feature space resulting from at least the textual descriptions; and a network module including instructions that when executed by the one or more processors cause the one or more processors to provide a behavior cloning model including at least the log encoder, the joint feature space, and the policy network to generate control behaviors from the driving behaviors defined in the joint feature space according to acquired observations of a surrounding environment of the vehicle, wherein the control behaviors control driving of the vehicle through the surrounding environment.

2. The vehicle behavior system of claim 1, wherein the training module includes instructions to generate the joint feature space including instructions to receive the textual descriptions that describe rules for controlling the vehicle, and receive the driving log snippets that indicate one or more control inputs associated with an observed behavior of the vehicle as observed via associated sensor data of the vehicle depicting a surrounding environment at a time of the observed behavior, and wherein the joint feature space defines a constrained space in which to search the driving behaviors.

3. The vehicle behavior system of claim 1, wherein the training module includes instructions to generate the joint feature space including instructions to train the log encoder to map the driving log snippets into the joint feature space as log feature vectors and to train a textual encoder to map the textual descriptions into the joint feature space as textual feature vectors that correspond to associated snippets of the driving log snippets.

4. The vehicle behavior system of claim 3, wherein the training module includes instructions to generate the joint feature space including instructions to enforce correspondence between the driving log snippets and the textual descriptions in the joint feature space by training the log encoder and the textual encoder using a loss function that is based, at least in part, on a similarity metric for comparing the log feature vectors and the textual feature vectors, and wherein the joint feature space regularizes the driving behaviors as lawful and interpretable actions for controlling the vehicle.

5. The vehicle behavior system of claim 3, wherein the log feature vectors and the textual feature vectors provide an encoded representation of the driving log snippets and the textual description according to at least a context and a temporal sequence of actions that define separate behaviors in the joint feature space and provide for associating the textual descriptions with the driving log snippets.

6. The vehicle behavior system of claim 1, wherein the joint feature space is a vector space identifying the driving behaviors mapped against driving rules defined by the textual descriptions and observed behaviors sampled in the driving log snippets that have been projected into the joint feature space to provide the driving log snippets as interpretable representations of the textual descriptions.

7. The vehicle behavior system of claim 1, wherein the network module includes instructions to provide the behavior cloning model including instructions to process sensor data from the vehicle using the behavior cloning model to identify the control behaviors from the joint feature space for controlling the vehicle.

8. The vehicle behavior system of claim 1, wherein the training module includes instructions to generate the joint feature space and to train the policy network in a two-stage training process for the behavior cloning model that is unsupervised, wherein the textual descriptions are structured driving rules from a driver handbook that are provided in a standardized format, wherein the driving log snippets include driver control inputs for controlling the vehicle and sensor data, and wherein the behavior cloning model forms a deep metric learning network.

9. A non-transitory computer-readable medium for determining driving behaviors for controlling a vehicle and including instructions that, when executed by one or more processors, cause the one or more processors to:

generate, using textual descriptions in combination with driving log snippets, a joint feature space that represents a coordinated mapping between the textual descriptions and the driving log snippets, wherein the instructions to generate the joint feature space include instructions to train a log encoder to map the driving log snippets into the joint feature space and train a textual encoder to map the textual descriptions into the joint feature space that correspond to associated snippets of the driving log snippets by applying a loss function as a similarity metric to determine a distance between log feature vectors and textual feature vectors in the joint feature space according to one of: a Euclidean distance, and a Mahalanobis distance, and wherein the log encoder and the textual encoder are machine learning models that are deep neural networks (DNNs);

train a policy network that is a machine learning model separate from the textual encoder and log encoder to generate identified behaviors from the driving behaviors according to a correspondence between an observed context that is mapped onto the joint feature space and the driving behaviors defined in the joint feature space resulting from at least the textual descriptions; and provide a behavior cloning model including at least the log encoder, the joint feature space, and the policy network to generate control behaviors from the driving behaviors defined in the joint feature space according to acquired observations of a surrounding environment of the vehicle, wherein the control behaviors control driving of the vehicle through the surrounding environment.

10. The non-transitory computer-readable medium of claim 9, wherein the instructions to generate the joint feature space include instructions to receive the textual descriptions that describe rules for controlling the vehicle, and receive the driving log snippets that indicate one or more control inputs associated with an observed behavior of the vehicle as observed via associated sensor data of the vehicle depicting a surrounding environment at a time of the observed behavior, and wherein the joint feature space defines a constrained space in which to search the driving behaviors.

11. The non-transitory computer-readable medium of claim 9, wherein the instructions to generate the joint feature space include instructions to train a log encoder to map the driving log snippets into the joint feature space as log feature vectors and to train a textual encoder to map the textual descriptions into the joint feature space as textual feature vectors that correspond to associated snippets of the driving log snippets.

12. The non-transitory computer-readable medium of claim 11, wherein the instructions to generate the joint feature space include instructions to enforce correspondence between the driving log snippets and the textual descriptions in the joint feature space by training the log encoder and the textual encoder using the loss function,
wherein the joint feature space regularizes the driving behaviors as lawful and interpretable actions for controlling the vehicle, and
wherein the log feature vectors and the textual feature vectors provide an encoded representation of the driving log snippets and the textual descriptions according to at least a context and a temporal sequence of actions that define separate behaviors in the joint feature space and provide for associating the textual descriptions with the driving log snippets.

13. A method, comprising:
generating, using textual descriptions in combination with driving log snippets, a joint feature space that represents a coordinated mapping between the textual descriptions and the driving log snippets, including training a log encoder to map the driving log snippets into the joint feature space and training a textual encoder to map the textual descriptions into the joint feature space that correspond to associated snippets of the driving log snippets by applying a loss function as a similarity metric to determine a distance between log feature vectors and textual feature vectors in the joint feature space according to one of: a Euclidean distance, and a Mahalanobis distance, and wherein the log encoder and the textual encoder are deep neural networks;
training a policy network that is a machine-learning model separate from the textual encoder and log encoder to generate identified behaviors according to a correspondence between an observed context that is mapped onto the joint feature space and driving behaviors defined in the joint feature space resulting from the textual descriptions; and
providing a behavior cloning model including at least the log encoder, the joint feature space, and the policy network to generate control behaviors according to acquired observations of a surrounding environment of a vehicle, and that control driving of the vehicle through the surrounding environment.

14. The method of claim 13, wherein generating the joint feature space includes receiving the textual descriptions that describe rules for controlling the vehicle, and receiving the driving log snippets that indicate one or more control inputs associated with an observed behavior of the vehicle as observed via associated sensor data of the vehicle depicting a surrounding environment at a time of the observed behavior, and
wherein the joint feature space defines a constrained space in which to search the driving behaviors.

15. The method of claim 13, wherein generating the joint feature space includes training the log encoder to map the driving log snippets into the joint feature space as log feature vectors and training a textual encoder to map the textual descriptions into the joint feature space as textual feature vectors that correspond to associated snippets of the driving log snippets.

16. The method of claim 15, wherein generating the joint feature space includes enforcing correspondence between the driving log snippets and the textual descriptions in the joint feature space by training the log encoder and the textual encoder using the loss function,
and
wherein the joint feature space regularizes the driving behaviors as lawful and interpretable actions for controlling the vehicle.

17. The method of claim 15, wherein the log feature vectors and the textual feature vectors provide an encoded representation of the driving log snippets and the textual description according to at least a context and a temporal sequence of actions that define separate behaviors in the joint feature space and provide for associating the textual descriptions with the driving log snippets.

18. The method of claim 13, wherein the joint feature space is a vector space identifying the driving behaviors mapped against driving rules defined by the textual descriptions and observed behaviors sampled in the driving log snippets that have been projected into the joint feature space to provide the driving log snippets as interpretable representations of the textual descriptions.

19. The method of claim 13, wherein providing the behavior cloning model includes processing sensor data from the vehicle using the behavior cloning model to identify the control behaviors from the joint feature space for controlling the vehicle.

20. The method of claim 13, wherein generating the joint feature space and training the policy network is a two-stage training process that is unsupervised,
wherein the textual descriptions are structured driving rules from a driver handbook that are provided in a standardized format, wherein the driving log snippets include driver control inputs for controlling the vehicle and sensor data, and
wherein the behavior cloning model forms a deep metric learning network.

* * * * *